(12) United States Patent
Korobkov

(10) Patent No.: US 10,041,612 B1
(45) Date of Patent: Aug. 7, 2018

(54) CURVILINEAR DUCT FABRICATED WITH ADDITIVE MANUFACTURING

(71) Applicant: Arevo, Inc., Santa Clara, CA (US)

(72) Inventor: Andrei Korobkov, Sunnyvale, CA (US)

(73) Assignee: Arevo, Inc., Santa Clara, CA (US)

( * ) Notice: Subject to any disclaimer, the term of this patent is extended or adjusted under 35 U.S.C. 154(b) by 0 days.

(21) Appl. No.: 15/459,630

(22) Filed: Mar. 15, 2017

(51) Int. Cl.
| | |
|---|---|
| *F16L 9/14* | (2006.01) |
| *F16L 9/00* | (2006.01) |
| *F16L 9/127* | (2006.01) |
| *B33Y 80/00* | (2015.01) |
| *B29C 67/00* | (2017.01) |
| *B29K 101/12* | (2006.01) |
| *B29K 105/12* | (2006.01) |

(52) U.S. Cl.
CPC .......... *F16L 9/006* (2013.01); *B29C 67/0059* (2013.01); *B33Y 80/00* (2014.12); *F16L 9/127* (2013.01); *B29K 2101/12* (2013.01); *B29K 2105/12* (2013.01)

(58) Field of Classification Search
CPC .......... F16L 9/006; F16L 9/127; B33Y 80/00; B29K 2105/06
USPC ................................. 138/177, 178, 129, 144
See application file for complete search history.

(56) References Cited

U.S. PATENT DOCUMENTS

| | | | | |
|---|---|---|---|---|
| 3,926,223 | A * | 12/1975 | Petzetakis | ............. B29C 47/003 138/129 |
| 5,679,456 | A * | 10/1997 | Sakai | ........................ B29B 9/14 428/189 |
| 5,936,861 | A | 8/1999 | Jang et al. | |
| 6,934,600 | B2 | 8/2005 | Jang et al. | |
| 9,422,024 | B2 * | 8/2016 | Al-Sheyyab | ........... B62K 19/16 |
| 2002/0190451 | A1 * | 12/2002 | Sancaktar | ............... B29C 53/12 267/166 |
| 2013/0069264 | A1 | 3/2013 | Giordano et al. | |
| 2014/0202577 | A1 * | 7/2014 | Webster, III | .......... F16L 41/023 138/177 |
| 2014/0291885 | A1 | 10/2014 | Etchegoyen et al. | |
| 2014/0296414 | A1 * | 10/2014 | Hattori | ..................... C08J 5/042 524/495 |
| 2016/0031155 | A1 | 2/2016 | Tyler | |
| 2016/0209820 | A1 | 7/2016 | Banadyga et al. | |
| 2016/0263832 | A1 | 9/2016 | Bui et al. | |
| 2016/0354756 | A1 | 12/2016 | Kamler | |
| 2017/0274583 | A1 * | 9/2017 | Vernon | ............... B29C 67/0014 |

FOREIGN PATENT DOCUMENTS

EP      3067184 A1      9/2016

OTHER PUBLICATIONS

USPTO, Office action, U.S. Appl. No. 15/459,747, dated Apr. 19, 2018.
Written Opinion of the International Searching Authority, PCT/US2018/021074, dated Jun. 14, 2018.

(Continued)

*Primary Examiner* — Patrick F Brinson
(74) *Attorney, Agent, or Firm* — McGeary Cukor LLC; Jason Paul DeMont; Kenneth Ottesen

(57) ABSTRACT

Curvilinear ducts manufactured by depositing one or more runs of material in a conjoined helix, a conjoined plurality of conjoined planar spirals, and a plurality of conjoined conical spirals.

11 Claims, 3 Drawing Sheets

(56) References Cited

OTHER PUBLICATIONS

International Search Report, PCT/US2018/021074, dated Jun. 14, 2018.
Written Opinion of the International Searching Authority, PCT/US2018/021091, dated Jun. 14, 2018.
International Search Report, PCT/US2018/021091, dated Jun. 14, 2018.

* cited by examiner

CURVILINEAR DUCT FABRICATED WITH ADDITIVE MANUFACTURING

STATEMENT OF RELATED APPLICATIONS

The following patent applications are incorporated by reference for their description of how to make and use additive manufacturing system 100:

U.S. patent application Ser. No. 15/375,832, filing date Dec. 12, 2016;

U.S. patent application Ser. No. 15/232,767, filing date Aug. 9, 2016;

U.S. patent application Ser. No. 14/574,237, filing date Dec. 17, 2014; and

U.S. patent application Ser. No. 14/623,471, filing date Feb. 16, 2015.

U.S. patent application Ser. No. 15/459,747, filed on Mar. 15, 2017, entitled "Duct Fabricated With Additive Manufacturing" is incorporated by reference for its description of how to manufacture ducts using helices, planar spirals, and conical spirals.

FIELD OF THE INVENTION

The present invention relates to additive manufacturing, which is often colloquially called "3D Printing," in general, and, more particularly, to manufacturing curvilinear ducts with additive manufacturing.

BACKGROUND

Additive manufacturing is a technique for building a three-dimensional object from a mathematical model of the object. In the additive manufacturing technique called fused-deposition modeling, the object is built by feeding a thermoplastic filament into a heated deposition head. The heated deposition head melts and deposits the molten thermoplastic material as one or more runs of material. Typically, a run of material is shaped like a thread or like the toothpaste that is squeezed from a tube but much smaller. When a run is deposited, it is just slightly above its melting point. After it is deposited, the run quickly solidifies and fuses with the runs that it touches.

Perhaps the greatest advantage of additive manufacturing is that it can build an object of any shape. To accomplish this, however, there are constraints on the sequence in which the runs can be deposited. First, each run must be supported. In other words, a run cannot be deposited on air. Therefore, each run must be deposited on:

(i) a platform that is not part of the object, or (ii) one or more previously-deposited runs that will be part of the object, or (iii) a temporary scaffold of support material that is not part of the object, or (iv) any combination of i, ii, and iii.

Second, when a three-dimensional surface is sealed, it is no longer possible to deposit a run inside of that surface. This is analogous to the situation in which once you close a box, you can't put anything into the box.

There is a general methodology that is used in additive manufacturing that satisfies these constraints and enables the building of an object of any shape. The three-dimensional model of the object is modeled as thousands of thin horizontal layers. Each layer is modeled as thousands of runs and voids. The object is then built, one run at a time, one layer at a time, only in the ±X, ±Y, and +Z directions.

There are, however, costs and disadvantages associated with traditional additive manufacturing.

SUMMARY OF THE INVENTION

Embodiments of the present invention are able to fabricate curvilinear ducts with additive manufacturing without some of the costs and disadvantages for doing so in the prior art. For example, ducts fabricated in accordance with the illustrative embodiments have more advantageous mechanical properties in comparison to ducts fabricated using prior art techniques.

Furthermore, some of the ducts that are manufactured in accordance with the illustrative embodiments comprise a continuous run of material, which enables advantageous mechanical properties in comparison to ducts that are manufactured with a plurality of discontinuous runs of material.

The run of material in some embodiments of the present invention chopped-fiber reinforced thermoplastic. It will be clear to those skilled in the art, after reading this disclosure, how to make and use alternative embodiments of the present invention in which the run of material is any satisfactory material.

A duct manufactured in accordance with the illustrative embodiment comprises one or more segments, wherein each segment is straight or curved. Furthermore, each segment is manufactured by depositing:

i. one or more conjoined helices, or ii. one or more stacks of conjoined planar spirals, or iii. one or more conjoined stacks of conical spirals, or iv. any combination of i, ii, and iii.

Co-pending U.S. patent application Ser. No. 15/459,747 entitled "Duct Fabricated With Additive Manufacturing" teaches how to make and use straight segments of ducts from helices, stacks of planar spirals, and conical spirals. In order to make curved segments of ducts, however, the dimensions of these structures must be altered.

In particular, the duct axis $\vec{d}(t)$ is a space curve represented by the vector function:

$$\vec{d}(t) = <a(t), b(t), c(t)>$$

and the longitudinal axis $\vec{r}(s)$ of the run of material is a space curve described by the vector function:

$$\vec{r}(s) = <f(s), g(s), h(s)>$$

The value of the value of the conjoining axis j(t) at $\vec{r}(s)$ is proportional to the distance between $\vec{r}(s)$ and the center of curvature $\vec{p}(t)$:

$$j(t) \propto \|\vec{r}(s) - \vec{p}(t)\|$$

This enables the run of material to remain conjoined and form a curved duct.

All dimensions and coordinates in this specification are stated in millimeters in a right-hand Cartesian and/or cylindrical coordinate system. It will be clear to those skilled in the art how to convert from one coordinate system to the other, and both coordinate systems will be used interchangeably. It will, however, be clear to those skilled in the art, after reading this disclosure, how to make and use alternative embodiments of the present invention that use any (small "m") metric system and any coordinate system.

It will be clear to those skilled in the art, after reading this disclosure, that the geometric descriptions of the illustrative embodiments are ideals and that the imperfection of manufacturing might produce objects with inconsequential differences in dimensions and geometry.

DETAILED DESCRIPTION

Figure 1:
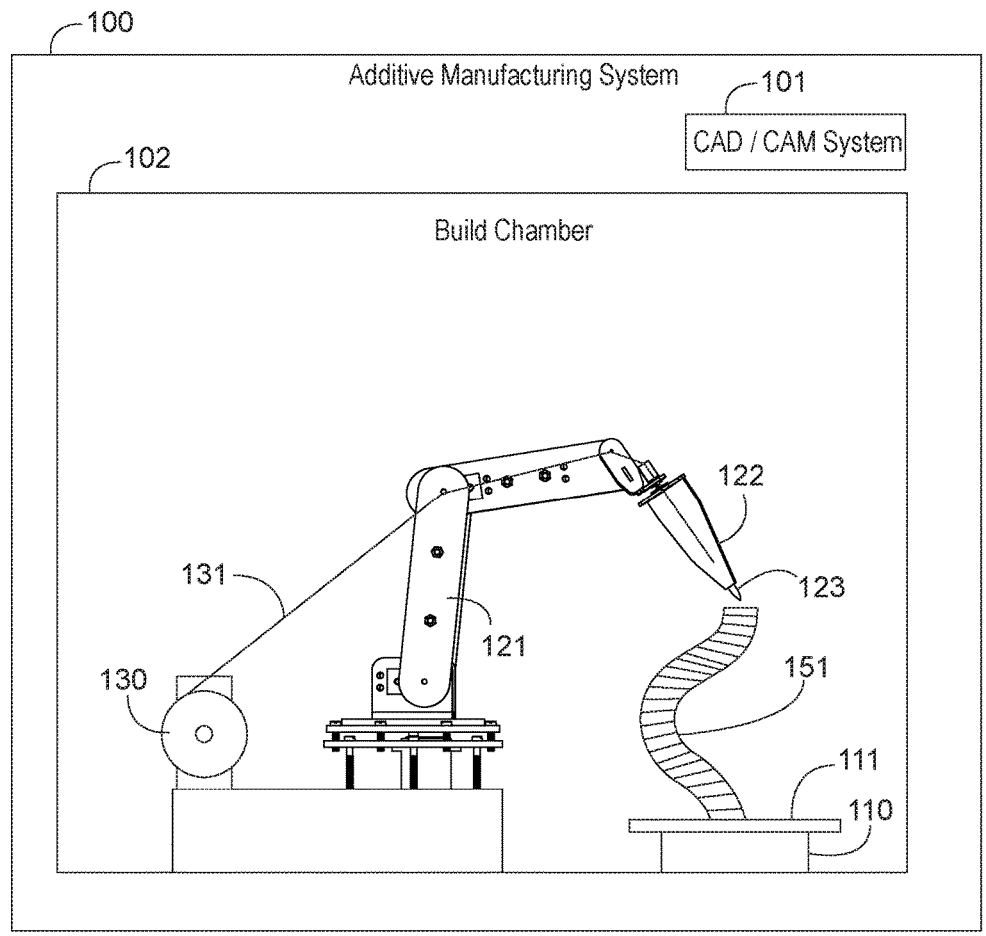
FIG. 1 depicts an illustration of the salient components of additive manufacturing system 100 in accordance with the illustrative embodiment of the present invention.

FIG. 1 depicts an illustration of the salient components of additive manufacturing system 100 in accordance with the illustrative embodiment of the present invention. Additive manufacturing system 100 comprises: CAD/CAM system 101, build chamber 102, turn-table 110, deposition platform 111, robotic arm 121 (which itself comprises deposition head 122 and deposition nozzle 123), thermoplastic filament spool 130, and thermoplastic filament 131. The purpose of manufacturing system 100 is to manufacture duct 151.

CAM controller 101 comprises the hardware and software necessary to direct build chamber 102, control robotic arm 121, deposition head 122, deposition nozzle 123, and turn-table 110 to manufacture duct 151. It will be clear to those skilled in the art, after reading this disclosure, how to make and use CAM controller 101.

Build chamber 102 is a thermally-insulated, temperature-controlled environment in which duct 151 is manufactured. It will be clear to those skilled in art how to make and use build chamber 102.

Turn-table 110 comprises a stepper motor under the control of CAM controller 101 that is capable of rotating platform 111 (and, consequently duct 151) around the Z-axis. In particular, turn-table 110 is capable of:
  i. rotating platform 111 clockwise around the Z-axis from any angle to any angle, and
  ii. rotating platform 111 counter-clockwise around the Z-axis from any angle to any angle, and
  iii. rotating platform 111 at any rate, and
  iv. maintaining (statically) the position of platform 111 at any angle.
It will be clear to those skilled in the art how to make and use turn-table 110.

Platform 111 comprises hardware on which duct 151 is manufactured. It will be clear to those skilled in the art how to make and use platform 111.

Robotic arm 121 is a seven-axis arm capable of placing deposition nozzle 123 at any location in the build volume of duct 151 and from any approach angle. Furthermore, robotic arm can move deposition nozzle 123 in:
  i. the +X direction,
  ii. the −X direction,
  iii. the +Y direction,
  iv. the −Y direction,
  v. the +Z direction,
  vi. the −Z direction, and
  vii. any combination of i, ii, iii, iv, v, and vi
while rotating the approach angle of deposition nozzle 123 around any point or temporal series of points. It will be clear to those skilled in the art how to make and use robotic arm 121.

Deposition head 122 is hardware that heats and deposits filament 131 (which may partially or wholly contain one or more fiber strands) via deposition nozzle 123.

Thermoplastic filament 131 comprises a continuous tow of carbon fiber that is impregnated with a thermoplastic, but it will be clear to those skilled in the art, after reading this disclosure, how to make and use alternative embodiments of the present invention in which thermoplastic filament 131 has a different fiber composition as described in U.S. patent application Ser. No. 14/184,010, which is incorporated by reference.

Thermoplastic filament 131 is deposited as a "run of material," which is not shown in FIG. 1 as distinct from duct 151. The physical and geometric properties of the runs of material are described below and in the accompanying figures.

Figure 2:
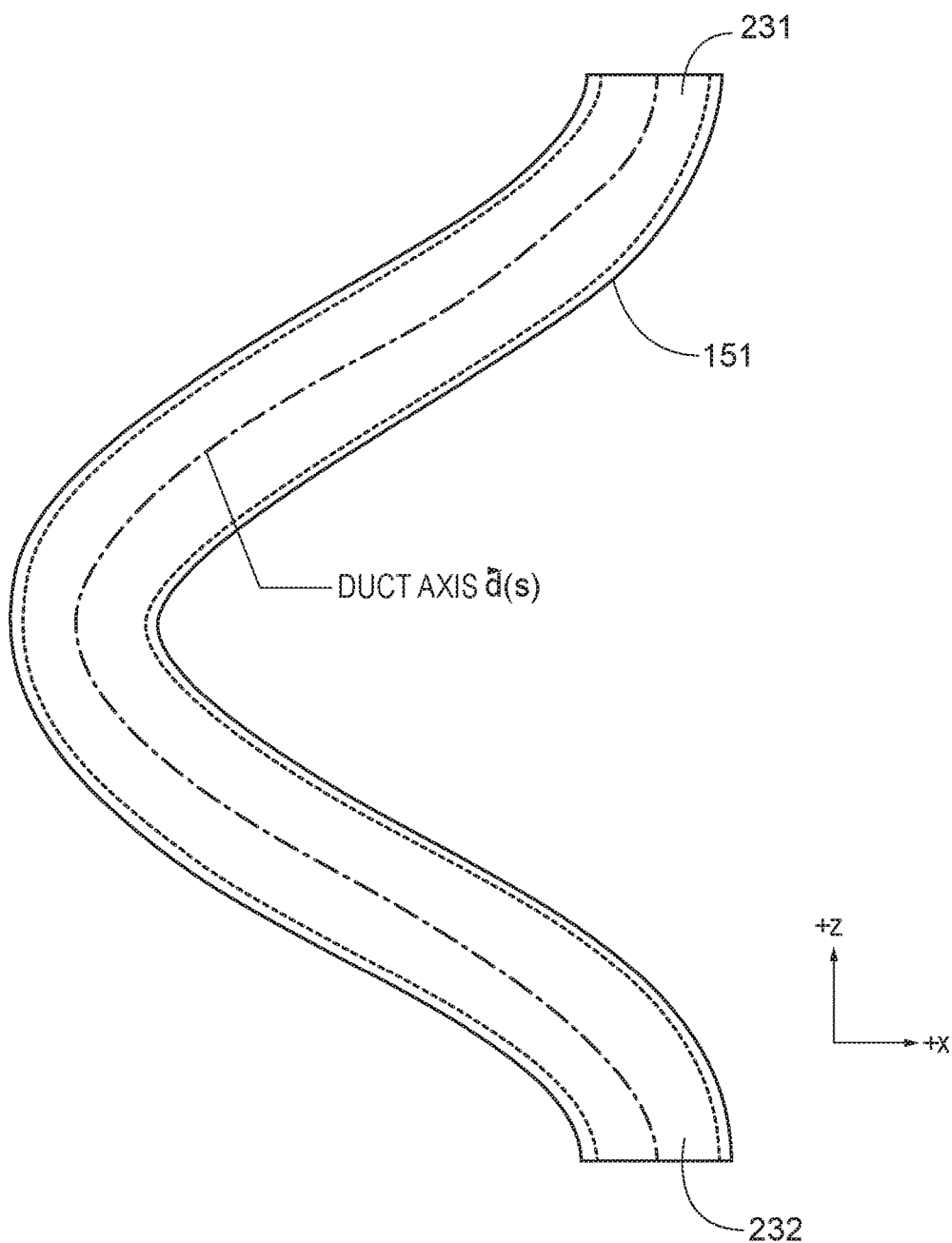
FIG. 2 depicts an illustration of an orthographic view of duct 151, which is an illustrative embodiment of the present invention.

FIG. 2 depicts an illustration of an orthographic elevation view of duct 151 in accordance with the illustrative embodiment of the present invention.

Duct 151 is a curvilinear duct that is capable of directing the flow of a fluid between opening 231 and 231. The curvature of duct 151 is defined by a three-dimensional space curve called the duct axis $\vec{d}(t)$.

In order to facilitate an understanding of the present invention, the duct axis $\vec{d}(t)$ of the illustrative embodiment is confined to a plane. It will be clear to those skilled in the art, after reading this disclosure, how to make and use alternative embodiments of the present invention in which duct axis $\vec{d}(t)$ is not confined to a plane (i.e., duct axis $\vec{d}(t)$ is a non-linear and a non-planar space curve).

In accordance with the illustrative embodiment, duct axis $\vec{d}(t)$ is described by a vector function whose general form is:

$$\vec{d}(t) = <a(t), b(t), c(t)> \quad \text{(Eq. 1a)}$$

where a(t), b(t), and c(t) are functions in a particular coordinate system (e.g., Cartesian, cylindrical, polar, etc.) and t is a real number in the domain t: [$t_1$, $t_2$]. It will be clear to those skilled in the art how to describe any space curve, and, therefore, any duct axis as a vector function. Furthermore, it will be clear to those skilled in the art how to represent the space curve of any duct axis using mathematical techniques other than vector functions.

The particular vector function (in Cartesian coordinates) for duct axis $\vec{d}(t)$ of duct 151 is:

$$a(t) = \frac{800}{3}\cos\left(\frac{\pi t}{500}\right) \quad \text{(Eq. 1b)}$$

$$b(t) = 0 \quad \text{(Eq. 1c)}$$

$$c(t) = s \quad \text{(Eq. 1d)}$$

where t is a real number in the domain t: [0, 1000]. It will be clear to those skilled in the art, after reading this disclosure, how to determine the vector function for any duct axis in any coordinate system.

Duct axis $\vec{d}(t)$ comprises curves, and the general equation for the curvature κ(t) of duct axis $\vec{d}(t)$ (expressed independently of any particular coordinate system) is:

$$\kappa(t) = \frac{|d(t)' \times d(t)''|}{|d(t)'|^3}. \quad \text{(Eq. 2a)}$$

When the vector function of duct axis $\vec{d}(t)$ is expressed in Cartesian coordinates, the equation for the curvature κ(t) of is:

$$\kappa(t) = \frac{\sqrt{(c''b' - c'b'')^2 + (a''c' - a'c'')^2 + (b''a' - a''b')^2}}{(a'^2 + b'^2 + c'^2)^{2/3}}. \quad \text{(Eq. 2b)}$$

It will be clear to those skilled in the art how to compute the curvature κ(t) of any duct axis for any value of the parameter t.

The radius of curvature δ(t) of duct axis $\vec{d}(t)$ equals:

$$\delta(t) = \frac{1}{\kappa(t)} \quad \text{(Eq. 3)}$$

which equals the distance from the duct axis $\vec{d}(t)$ to the center of curvature $\vec{p}(t)$, which is a space curve that is described by the vector function:

$$\vec{p}(t) = <\alpha(t), \beta(t), \gamma(t)> \quad \text{(Eq. 4)}.$$

where α(t), β(t), and γ(t) are functions in the same coordinate system as that used for describing duct axis $\vec{d}(t)$. It will be clear to those skilled in the art how to determine the center of curvature $\vec{p}(t)$ for any duct axis $\vec{d}(t)$. For example, it is well known to those skilled in the art that the center of curvature $\vec{p}(t)$ is the point that lies at the radius of curvature δ(t) from duct axis $\vec{d}(t)$ (i.e., $\delta(t) = \|\vec{d}(t) - \vec{p}(t)\|$) in the direction of the unit principal normal vector of duct axis $\vec{d}(t)$ (into the curve). As space curve $\vec{p}(t)$ is known as the evolute of $\vec{d}(t)$. When duct axis $\vec{d}(t)$ is a planar curve, the evolute of $\vec{d}(t)$ is also a planar curve. In contrast, when duct axis $\vec{d}(t)$ is a non-planar space curve, the evolute of $\vec{d}(t)$ is also a non-planar space curve.

In accordance with the illustrative embodiment, duct 151 comprises a continuous run of material whose longitudinal axis $\vec{r}(s)$ is a space curve described by the vector function:

$$\vec{r}(s) = <f(s), g(s), h(s)> \quad \text{(Eq. 5)}$$

where f(s), g(s), and h(s) are functions in the same coordinate system as that used for describing duct axis $\vec{d}(t)$. It will be clear to those skilled in the art, after reading this disclosure, how to determine the vector function for whose longitudinal axis $\vec{r}(s)$ for any duct, whether it comprises a helix, one or more planar spirals, or one or more conical spirals.

For curved ducts and the curved portions of curvilinear ducts, the value of the conjoining axis j(t) is a function of t. In particular, the value of the conjoining axis j(t) at $\vec{r}(s)$ is proportional to the distance between $\vec{r}(s)$ and the center of curvature $\vec{p}(t)$:

$$j(t) \propto \|\vec{r}(s) - \vec{p}(t)\| \quad \text{(Eq. 6)}.$$

This enables the run of material to remain conjoined and form a curved duct. In accordance with the illustrative embodiment, the range of j(t) is between 0.1 millimeters and 0.5 millimeters, but it will be clear to those skilled in the art, after reading this disclosure, how to select the values of j(t)—in accordance with Equation 6—for any duct.

The value of the isolating axis i(t) depends on the deposition process and the desired mechanical characteristics of duct 151. For example, the value of the isolating axis i(t) can be a constant:

$$i(t) = I \quad \text{(Eq. 7a)}.$$

Alternatively, the value of the isolating axis i(t) can also vary as a function of the distance from $\vec{r}(s)$ to the center of curvature $\vec{p}(t)$:

$$i(t) \propto j(t) \propto \|\vec{r}(s) - \vec{p}(t)\| \quad \text{(Eq. 7b)}.$$

In any case, it will be clear to those skilled in the art, after reading this disclosure, how to select the particular values of i(t)—in accordance with equations 7a or 7b—for any duct.

Figure 3:
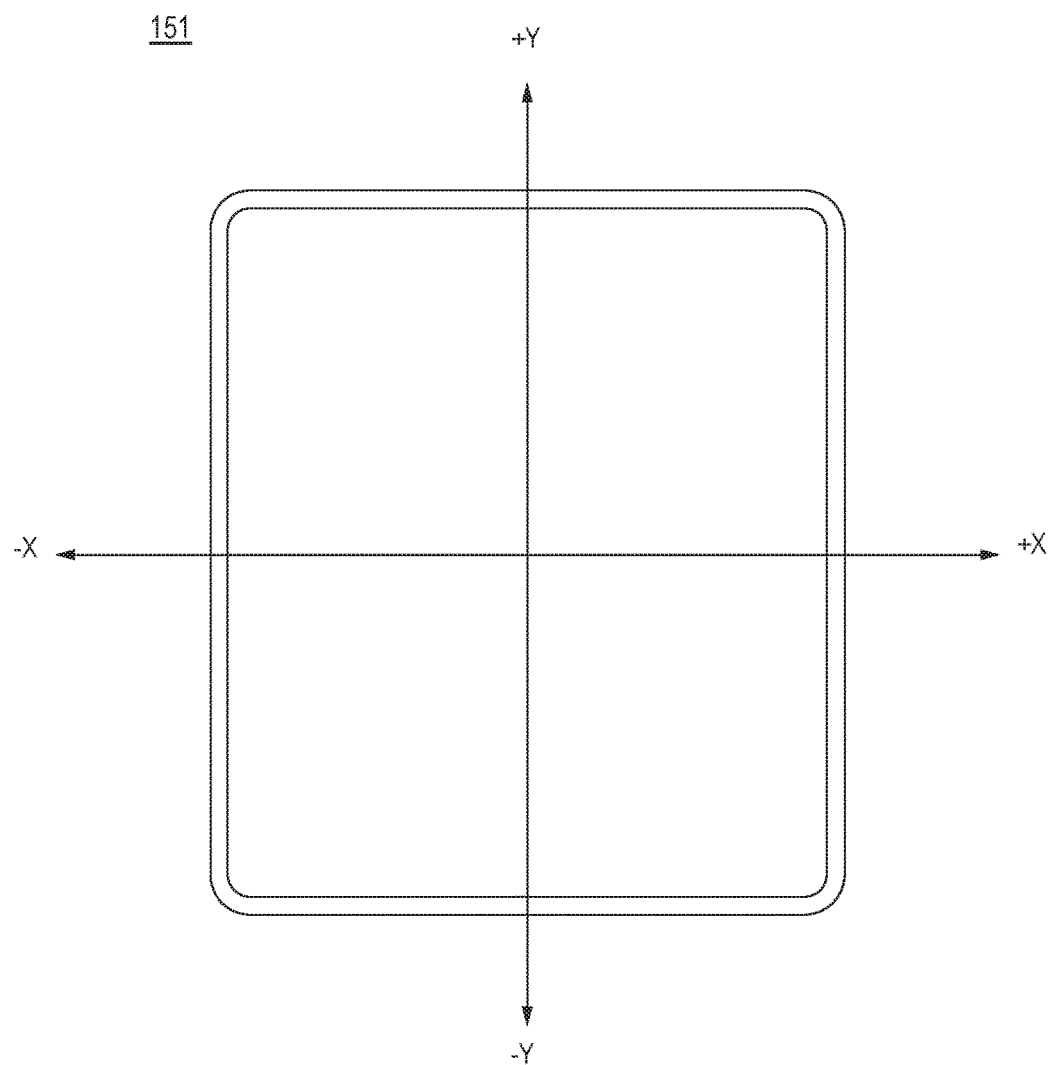
FIG. 3 depicts an illustration of a cross-sectional view of duct 151.

It will be clear to those skilled in the art, after reading this disclosure, how to modify any duct taught in the co-pending patent application entitled "Duct Fabricated With Additive Manufacturing" (U.S. patent application Ser. No. 15/459,747) to have one or more curved segments. For example, any duct can be manufactured by depositing a continuous run of material in the form of a conjoined helix—with any profile including, but not limited to circular and rectangular-with-rounded corners. FIG. 3 depicts a cross-sectional view of duct 151 featuring a rectangular-with-rounded-corners profile. Additionally, any duct can be manufactured by depositing a conjoined stack of conjoined planar spirals—with each planar spiral having any profile including, but not limited to circular and rectangular-with-rounded corners. And still furthermore, any duct can be manufactured by depositing a conjoined stack of conical spirals—with each conical spiral having any profile including, but not limited to circular and rectangular-with-rounded corners.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A duct with a duct axis $\vec{d}(t)$ described by the vector function:

$$\vec{d}(t) = <a(t), b(t), c(t)>,$$

the duct comprising:

a run of material having a longitudinal axis $\vec{r}(s)$ described by the vector function:

$$\vec{r}(s) = <f(s), g(s), h(s)>$$

that forms a helix around the duct axis $\vec{d}(t)$;
wherein the helix is a rectangular-with rounded-corners helix;
wherein the duct axis $\vec{d}(t)$ is characterized by a curvature κ(t) and a center of curvature $\vec{p}(t)$ described by the vector function:

$$\vec{p}(t) = <\alpha(t), \beta(t), \gamma(t)>;$$

wherein the curvature κ(t)>0;

wherein the run of material is characterized by a conjoining axis j(t) at $\vec{r}(s)$ such that $j(t) \propto \|\vec{r}(s) - \vec{p}(t)\|$; and wherein t is a real number in the domain t: $[t_1, t_2]$ and s is a real number in the domain s: $[s_1, s_2]$.

2. The article of claim 1 wherein the run of material has an isolating axis i(t) at $\vec{r}(s)$ such that $i(t) \propto \|\vec{r}(s) - \vec{p}(t)\|$.

3. The article of claim 1 wherein the run of material has an isolating axis i(t) at $\vec{r}(s)$ that is constant.

4. The article of claim 1 wherein the evolute of $\vec{d}(t)$ is a non-planar space curve over the interval $[t_1, t_2]$.

5. The article of claim 1 wherein the run of material is chopped-fiber reinforced thermoplastic.

6. A duct with a duct axis $\vec{d}(t)$ described by the vector function:

$$\vec{d}(t) = <a(t), b(t), c(t)>,$$

the duct comprising:

a run of material having a longitudinal axis $\vec{r}(s,k)$ described by the vector function:

$$\vec{r}(s,k) = <f(s,k), g(s,k), h(s,k)>$$

that forms a first conical spiral around the duct axis $\vec{d}(t)$;

wherein the duct axis $\vec{d}(t)$ is characterized by a curvature $\kappa(t)$ and a center of curvature $\vec{p}(t)$ described by the vector function:

$$\vec{p}(t) = <\alpha(t), \beta(t), \gamma(t)>;$$

wherein the curvature $\kappa(t) > 0$;

wherein the run of material is characterized by a conjoining axis j(t) at $\vec{r}(s,k)$ such that $j(t) \propto \|\vec{r}(s,k) - \vec{p}(t)\|$; and wherein t is a real number in the domain t: $[t_1, t_2]$, s is a real number in the domain s: $[s_1, s_2]$, and k is an integer.

7. The article of claim 6 wherein the run of material has an isolating axis i(t) at $\vec{r}(s,k)$ such that $i(t) \propto \|\vec{r}(s,k) - \vec{p}(t)\|$.

8. The article of claim 6 wherein the run of material has an isolating axis i(t) at $\vec{r}(s,k)$ that is constant.

9. The article of claim 6 wherein the evolute of $\vec{d}(t)$ is a non-planar space curve over the interval $[t_1, t_2]$.

10. The article of claim 6 further comprising a second conical spiral around the duct axis $\vec{d}(t)$, wherein the first conical spiral and the second conical spiral are conjoined.

11. The article of claim 1 wherein the conical spiral is a rectangular-with rounded-corners conical spiral.

* * * * *